Patented Mar. 13, 1934

1,950,981

UNITED STATES PATENT OFFICE 1,950,981

TREATMENT AND PURIFICATION OF CERTAIN GASES

Wilhelm Gluud and Walter Klempt, Dortmund-Eving, Germany, assignors to Gesellschaft für Kohlentechnik m. b. H., Dortmund-Eving, Germany No Drawing. Application July 16, 1930, Serial No. 468,446. In Germany July 16, 1929

3 Claims. (Cl. 23—3)

For a long time endeavours have been made to free heating gas and particularly lighting gas which is supplied to dwelling houses, from undesirable by-products. There are thus many suggestions current for the purification of the gas, particularly with regard to the removal of its carbon monoxide content. Further, it has always been found desirable to free the gas from its sulphur content, which sulphur is present in the form of organic compounds which are not removed by the usual purification, since the gas burners and the like are unfavourably influenced as regards their permanency by these compounds. All efforts for the complete sulphur removal and purification have hitherto not led to satisfactory results since a sufficiently simple process cannot be achieved which is at the same time cheap and sufficiently accurate to justify the practical adoption.

The process of the present invention removes these difficulties in a surprisingly simple manner.

The gas to be purified or improved after being provided with the necessary proportion of water vapour is led over material, such, for example, as calcined dolomite at a raised temperature such that on the one hand the dolomite is able to exert a catalytic action for the conversion of carbon monoxide with water vapour to carbon dioxide, while on the other hand the carbon dioxide produced is absorbed and held in the solid state. The carbon monoxide may thus be completely converted into carbon dioxide and an equal volume of hydrogen takes the place of the carbon monoxide which was in the gas. The removal of carbon monoxide can take place in this manner until as little as $\frac{1}{10}$ percent remains, and indeed even further. The complete removal of the carbon monoxide takes place since the reaction equilibrium is continuously disturbed by the continuous removal of a produced component ($CO_2$) according to the action of mass law, so that the process must proceed completely in the sense of CO conversion. The water vapour required for this conversion is unimportant since theoretically only the quantity of water vapour corresponding exactly to the volume of carbon monoxide is necessary. Practically, even with small CO contents the use of this quantity, and if necessary several-fold excess, plays no part, so that in this respect the process always remains limited by practical or economic considerations. In cases where the natural water vapour content of the gas is itself sufficient to effect the conversion of the carbon monoxide in addition the water vapour content of the gas may be further reduced.

A further effect of this gas treatment at high temperature is the far reaching splitting up and conversion of the organic sulphur compounds with the result that organically combined sulphur is converted into hydrogen sulphide which is readily removed by known methods if it is not for the greater part absorbed by the calcined dolomite, and in the subsequent regeneration removed or converted into $CaSO_4$. It may also in certain circumstances be advantageous to omit entirely the previous removal of sulphur from the gases and not to effect the removal until after the process of the invention and in this case the results due to cyanide values remaining in the gases, such as the formation of ammonia, etc., are to be expected.

It is obvious that in carrying out this process on a large scale all the precautions which appear requisite in view of the present state of technology and knowledge in the art should be utilized, so that for example regeneration of heat which is necessary in view of heat economy can be effected by transmitting the physical heat contained in the gas which is drawn off and in the gases escaping in the burning process, to the incoming fresh gas. Corresponding economy of heat must also be effected in view of the water vapour content of the gases, and particularly in view of the enriching of the water vapour content of the fresh gas. Further the splitting up effect on the organic sulphur compounds can be increased by the catalysts which are to-day known for this purpose. Furthermore, the use of the process is not limited to the dolomite given above by way of example, but fundamentally all bodies or mixtures which have the property of favouring the reaction $CO+H_2O=CO_2+H_2$, and in addition to retain stably the carbonic acid produced can be used for carrying out the process, it being also obvious that these bodies, if they should not have the requisite physical properties can be pressed, moulded or supplemented with binding materials in order to impart to them the requisite physcal properties. It is also possible to augment the catalytic effect for increasing the speed of the process, or for reducing the temperature, by means of catalytically active additions, and this step is expressly undertaken in the present case. In cases in which a control of the heating value of the gases to be treated is necessary the process described can be combined with a preceding cracking of the coal distillation gas, so that for example with gases of high heating power a part of the gas can be decomposed according to the equations:

$$CH_4+2H_2O=CO_2+4H_2$$
$$CH_4+H_2O=CO+3H_2$$

and this cracked gas can be transformed into hydrogen by the process according to the invention by removing the CO or the $CO_2$ so that in this manner an extensive control of the heating value is possible. In the same manner additions of water gas or generator gas as are frequently supplied by many gas works can be transformed by means of the process according to the invention into hydrogen, and it may be desirable according to the local conditions to effect this transformation with the stream of additional gas alone or with the entire gas mixture. In the removing of poisons from illuminating gas by this process a decomposition of a small part of the heavy hydrocarbons with the separation of carbon may occur at high temperature. The quantity of the carbon thus separating is, however, so small that no stoppages are to be feared, particularly as the carbon is regasified by the subsequent burning with the utilization of its heat of combustion.

A further advantage of the process resides in that the gas after the treatment is free from oxygen as this burns with hydrogen to form water vapour.

In carrying out the invention the material absorbing the carbonic acid and acting as a catalyst, whether it is dolomite, for example, or some other material corresponding thereto, becomes exhausted after some time as it is transformed wholly or to a large extent into carbonate. Naturally the material must then be regenerated and this can be done by a simple burning process either with direct flames or by indirect heating, whereafter the material is again usable. In the selection of the material for absorbing the carbonic acid this requirement and regeneration should be taken into account, and every relationship, whether of the physical or chemical kind, which is encountered in this selection is expressly considered. Thus, for example, when using dolomites those dolomites are to be selected in which the composition of the calcium and magnesium portion is naturally such or is so artificially prepared that the effect is as favourable as possible, which applies, for example, for dolomite of the composition Mg:Ca=approximately 1:1. The consideration of physical structure has been mentioned above, and it should also now be mentioned that there may be a favourable catalytic effect from certain impurities associated with natural dolomites such as iron, aluminium compounds and the like. Obviously it is also necessary to choose a suitable calcination temperature in order to obtain a suitable capacity for reaction of the dolomite or other materials.

For practical purpose it is frequently not so important to obtain a gas which is completely free from carbon dioxide when it is a question chiefly of the purification of lighting gas. It is possible for lighting gas to contain a proportion of from 2 to 3% of carbon dioxide, and the invention may be modified to give a process in which a better use of the materials for absorbing the carbon dioxide and for converting the carbon monoxide into dioxide is obtained. The utility of the absorption material employed is considerably increased when an end product gas containing a small percentage of carbon dioxide can be used without further treatment, and, moreover, this small amount of this gas can be satisfactorily removed in various ways. For instance by washing under pressure.

There is, thus, in such a case a conversion of the carbon monoxide to carbon dioxide and a partial removal of the carbon dioxide formed aimed at. This is attained by controlling the temperature in such a manner that the absorption material shows an appreciable carbon dioxide vapor pressure. This is the case, for instance, at temperatures over 600° C. with materials containing calcium carbonate.

What we claim is:—

1. The method of purifying gases containing carbon monoxide and organic sulphur compounds, consisting in adding steam to the respective gas, and leading the mixture over calcined dolomite so as to obtain a conversion of the carbon monoxide into carbon dioxide by the catalytic action of said dolomite, as well as an absorption of the carbon dioxide, leading said mixture over said substance being effected at a temperature, at which rise is given to a determined carbonic dioxide vapor pressure, and to absorb that carbon dioxide which is in excess over said pressure, said sulphur compounds being at the same time converted into hydrogen sulphide and the unabsorbed carbonic dioxide being removed from the resultant gas.

2. The method of purifying gases containing carbon monoxide, consisting in adding steam to the respective gas, and conducting the mixture over calcined dolomite.

3. The method of purifying gases containing carbon monoxide, consisting in adding steam to the respective gas and leading the mixture over calcined dolomite heated to so elevated a temperature that rise is given to a determined carbon dioxide vapor pressure and to absorb that carbon dioxide which is in excess of said pressure.

WILHELM GLUUD.
WALTER KLEMPT.